United States Patent
Castinado et al.

(10) Patent No.: US 11,669,367 B2
(45) Date of Patent: Jun. 6, 2023

(54) SYSTEM AND METHODS FOR GENERATION AND ANALYSIS OF REAL-TIME RESOURCE REQUESTS

(71) Applicant: BANK OF AMERICA CORPORATION, Charlotte, NC (US)

(72) Inventors: Joseph Benjamin Castinado, North Glenn, CO (US); Paulette LaShon Bryant, Charlotte, NC (US); Kathleen Hanko Trombley, Oakboro, NC (US); Therese Humburg Willis, Apopka, FL (US); Paul Benton Murphy, Tigard, OR (US); Lee Ann Proud, Ponte Vedra, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 388 days.

(21) Appl. No.: 16/837,847

(22) Filed: Apr. 1, 2020

(65) Prior Publication Data
US 2021/0311785 A1 Oct. 7, 2021

(51) Int. Cl.
*G06F 9/50* (2006.01)
*H04L 9/40* (2022.01)
*G06Q 20/02* (2012.01)
*H04L 51/066* (2022.01)
*H04L 67/565* (2022.01)

(52) U.S. Cl.
CPC ......... *G06F 9/5005* (2013.01); *G06Q 20/023* (2013.01); *H04L 63/08* (2013.01); *G06F 2209/503* (2013.01); *H04L 51/066* (2013.01); *H04L 67/565* (2022.05)

(58) Field of Classification Search
CPC .... G06F 9/5005; G06Q 20/22; G06Q 20/382; G06Q 20/027; G06Q 20/10; G06Q 20/023; G06Q 20/405; H04L 67/565; H04L 51/066
See application file for complete search history.

(56) References Cited

U.S. PATENT DOCUMENTS

| | | |
|---|---|---|
| 6,167,378 A | 12/2000 | Webber, Jr. |
| 7,698,216 B2 | 4/2010 | Provinse |
| 7,729,972 B2 | 6/2010 | Murphy et al. |
| 7,925,586 B2 | 4/2011 | Cole et al. |
| 8,025,213 B2 | 9/2011 | Hartfield et al. |
| 8,131,627 B2 | 3/2012 | Sadre |
| 8,407,141 B2 | 3/2013 | Mullen et al. |
| 8,521,613 B2 | 8/2013 | Erbey et al. |
| 8,626,599 B2 | 1/2014 | Eastley et al. |
| 8,712,887 B2 | 4/2014 | DeGroeve et al. |

(Continued)

*Primary Examiner* — Tom Y Chang
(74) *Attorney, Agent, or Firm* — Moore & Van Allen PLLC; Nicholas C. Russell

(57) ABSTRACT

Embodiments of the invention are directed to a system, method, or computer program product generation and analysis of real-time resource requests via a resource platform. A resource platform is provided for receiving and automating the management and processing of resource requests submitted by entities or users. The system embraces a fully digital approach to resource request processing, analysis, authentication, and reporting. In addition, the invention allows for analysis of reconciliation data of executed resource transfers for identification of useful trends that can be used for proactive accommodation of entity policies to align with perceived user preferences.

17 Claims, 4 Drawing Sheets

(56) References Cited

U.S. PATENT DOCUMENTS

| | | |
|---|---|---|
| 8,732,044 B2 | 5/2014 | Lovelett et al. |
| 10,387,858 B2 | 8/2019 | Novak et al. |
| 10,803,432 B1* | 10/2020 | Miles ................... G06Q 20/14 |
| 2003/0050879 A1 | 3/2003 | Rosen et al. |
| 2003/0182206 A1 | 9/2003 | Hendrix et al. |
| 2005/0246240 A1 | 11/2005 | Padilla |
| 2009/0125440 A1 | 5/2009 | Maeng |
| 2010/0153239 A1 | 6/2010 | Liebich et al. |
| 2010/0211499 A1* | 8/2010 | Zanzot ................... G06Q 20/10 |
| | | 705/40 |
| 2011/0055079 A1 | 3/2011 | Meaney et al. |
| 2011/0125645 A1 | 5/2011 | Benkert et al. |
| 2011/0208960 A1* | 8/2011 | Flood ................ H04L 51/066 |
| | | 713/153 |
| 2012/0157062 A1* | 6/2012 | Kim ..................... H04M 15/41 |
| | | 705/26.1 |
| 2014/0195432 A1 | 7/2014 | Smith, Jr. et al. |
| 2014/0304057 A1 | 10/2014 | Lal et al. |
| 2015/0199660 A1 | 7/2015 | Dolan et al. |
| 2016/0012465 A1* | 1/2016 | Sharp .................. G06Q 20/321 |
| | | 705/14.17 |
| 2016/0092857 A1* | 3/2016 | Amos ............... G06Q 20/0855 |
| | | 705/39 |
| 2016/0117665 A1* | 4/2016 | Davis .................. G06Q 20/223 |
| | | 705/39 |
| 2016/0300237 A1* | 10/2016 | Khan ................. G06Q 20/3223 |
| 2017/0046697 A1 | 2/2017 | Sheehan et al. |
| 2018/0122017 A1 | 5/2018 | Brinkman |
| 2018/0165662 A1* | 6/2018 | Nam ................ G06Q 20/40145 |
| 2019/0220853 A1* | 7/2019 | Srinivasan ............. G06Q 20/10 |
| 2020/0287897 A1* | 9/2020 | Jha ....................... G06Q 20/405 |
| 2021/0004772 A1 | 1/2021 | Dolan et al. |
| 2021/0004773 A1 | 1/2021 | Dolan et al. |
| 2021/0383378 A1 | 12/2021 | McCoy et al. |

\* cited by examiner

SYSTEM AND METHODS FOR GENERATION AND ANALYSIS OF REAL-TIME RESOURCE REQUESTS

FIELD OF THE INVENTION

The present disclosure embraces a system and methods for processing, authorization, and automation of resource requests and resource transfer.

BACKGROUND

Current solutions for processing resource requests, particularly in the context of entity resource requests, do not embrace most efficient methods and systems for processing and automation. As such, there is a need for solutions that implement most efficient methods of resource transfer in the context of entity resource requests.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Resource requests in the context of entity expenses such as business expenses and reimbursements are typically processed for resource transfer using traditional methods such as paper checks. In light of development of more efficient resource transfer technologies and payment rails, there is a clear need for innovative solutions for automating and more efficiently executing resource transfers and entity resource transfer reimbursements. The present invention embraces efficient resource transfer technologies to create an automated resource transfer loop that integrates modern invoicing systems for payment of resources in a business resource expense context. Such solutions automate the process for users of the system saving users time, increases efficiency, reliability, tracking ability, and accuracy, and reduces the amount of time between the point at which resource requests are generated and received, and the point at which resources are disbursed and accounted for. In addition, by nature of automating the described processes in a completely digital approach, the invention provides accessible and reliable historic data trail for optimizing response times and accuracy of information in situations where such information may be required from a regulator, auditor, and the like.

For instance, in some embodiments, use cases might involve executive repayment of resource requests, such as resource requests related to travel expenses, lodging expenses, development expenses and the like. The system may provide an interface wherein a requesting entity or the user (e.g., executive or employee of an entity), may submit a request for resource disbursement. The system may receive such resource requests directly from requesting entities or users in electronic form, allowing the system to analyze, and review the resource request for disbursement qualifications. One or more messages or metadata may be generated in association with the resource request in order to request additional information or inform the requesting entity or user of disbursement qualification details and decisions. The system may determine routing of messages and generate a user interface display for direct resource disbursement review by the requesting entity or user, or user administrator of the system. The system may process the resource transfer for disbursement of resources using one or more resource transfer rails, and may integrate such processing with existing technologies for resource transfer.

In some embodiments, the invention generally may include a system for generation and analysis of real-time resource requests via a resource platform, the system comprising: at least one memory device with computer-readable program code stored thereon; at least one communication device; at least one processing device operatively coupled to the at least one memory device and the at least one communication device, wherein executing the computer-readable program code is configured to cause the at least one processing device to: receive resource request data associated with a resource request at the resource platform; extract resource transfer metadata from the resource request; convert the resource request data and resource transfer metadata to an internal resource message format and store converted data on the resource platform; based on the resource request data, identify a user responsible for authentication of the resource request data; access a user configuration for the user to determine authorization routing information comprising a digital channel; perform a second conversion of resource request data to a format for transmission over the digital channel; transmit the resource request data to a user device of the user via the digital channel; receive user authentication for execution of the resource request; execute a resource transfer in response to receiving user authentication for execution of the resource request; perform confirmation, settlement, and reconciliation of the executed resource transfer; and transmit notification of completion of the execution of the resource transfer to the user or one or more entities.

In some embodiments, the internal resource message format is an industry standard ISO 20022 format.

In some embodiments, the digital channel further comprises a communication channel such as a web portal, mobile application, email message, or a text message.

In some embodiments, resource transfer metadata comprises one or multiple of a resource transfer type, a resource transfer purpose, an entity identification, itemized product or service cost information, a date, a time, geolocation data, a total resource amount, a resource type, user identification information, or resource account information.

In some embodiments, reconciliation further comprises analyzing multiple executed resource transfers to identify trends in resource transfer metadata such as geolocation, or category of services and goods.

In some embodiments, performing settlement further comprises confirming that an amount of resources transferred balance between an originating and a destination account.

In some embodiments, confirmation further comprises verifying that a specific amount of resources have been transferred to a destination resource account, or that the specific resource amount exists in a source resource account.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
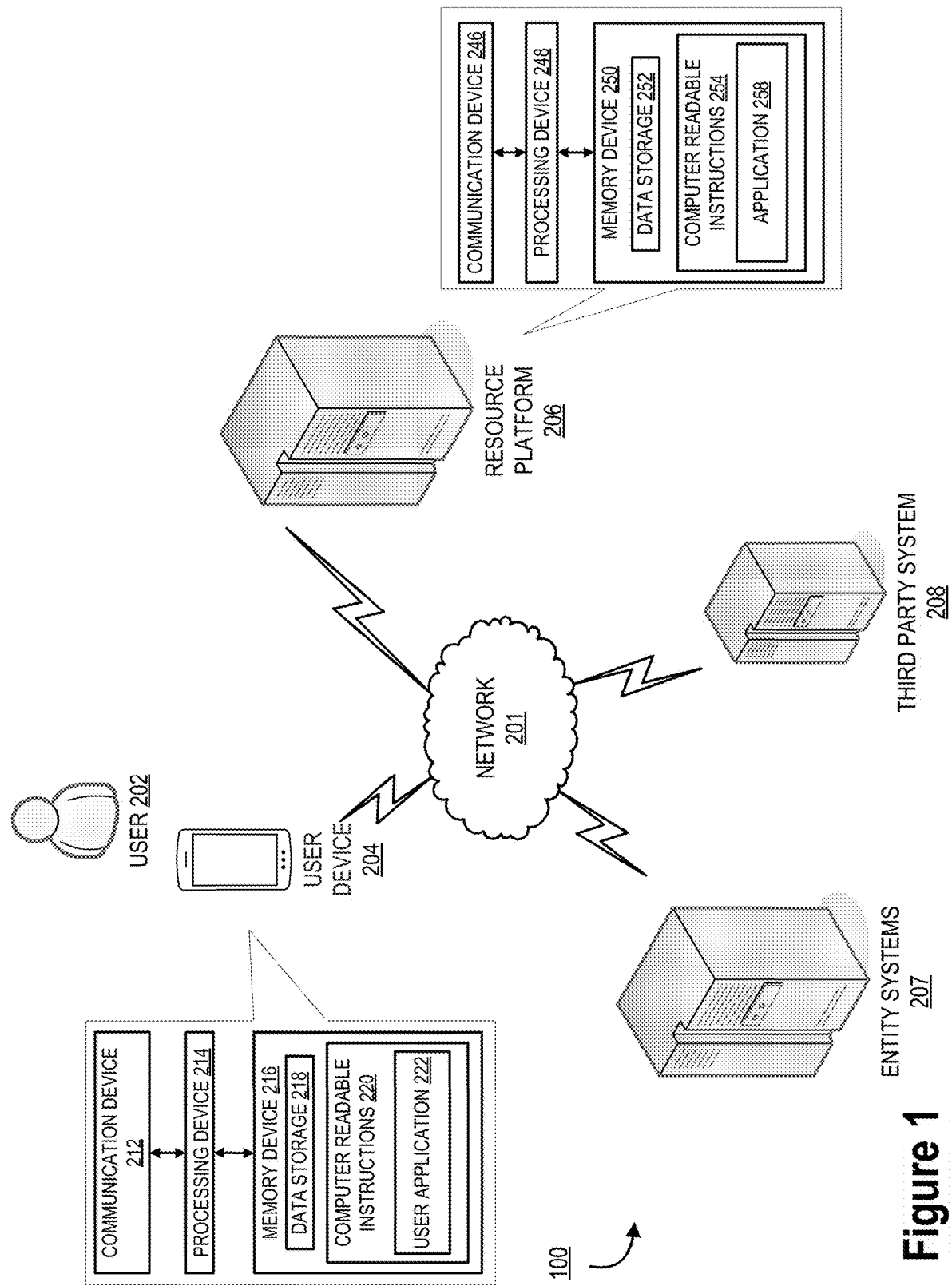
Figure 2A:
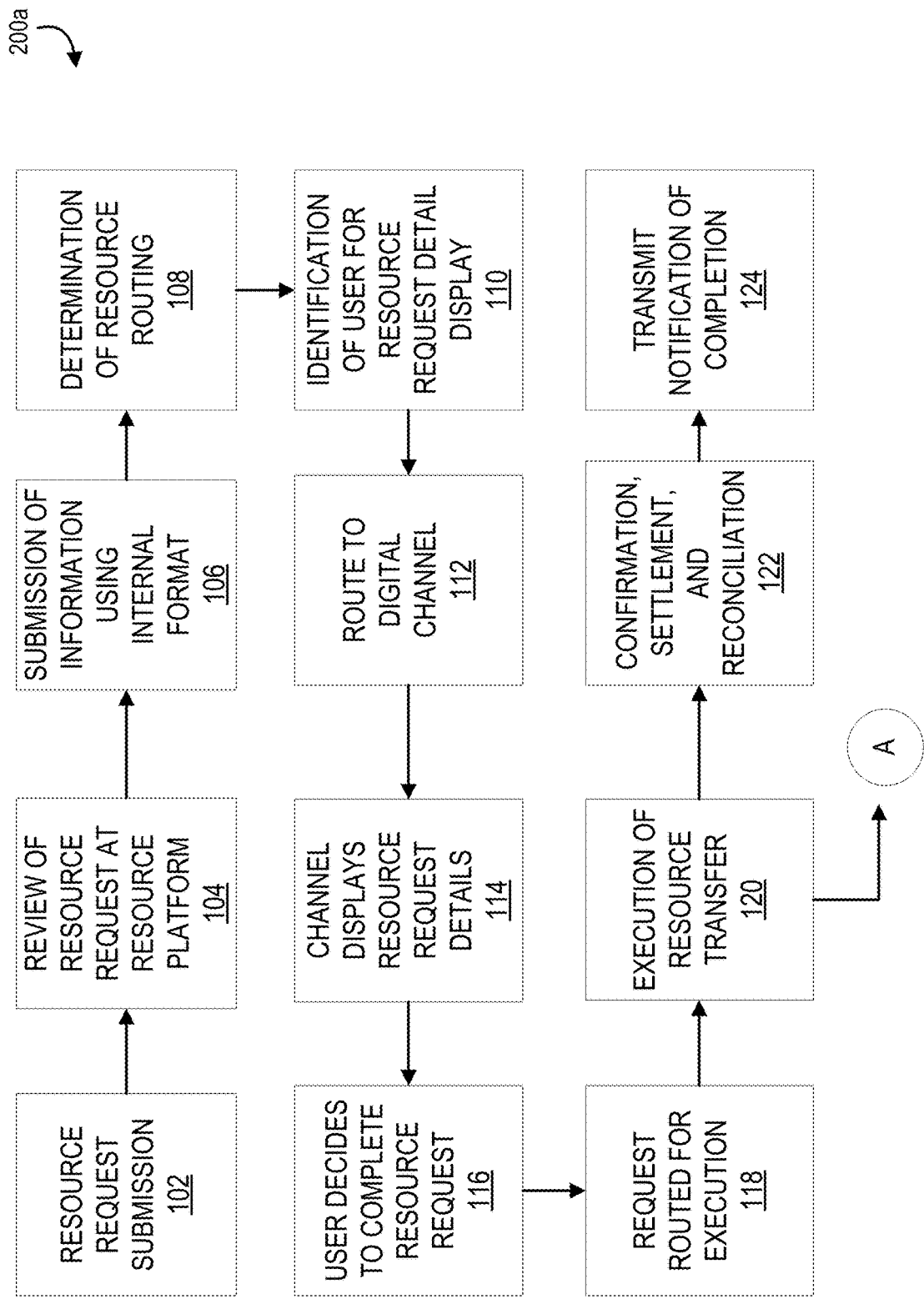
Figure 2B:
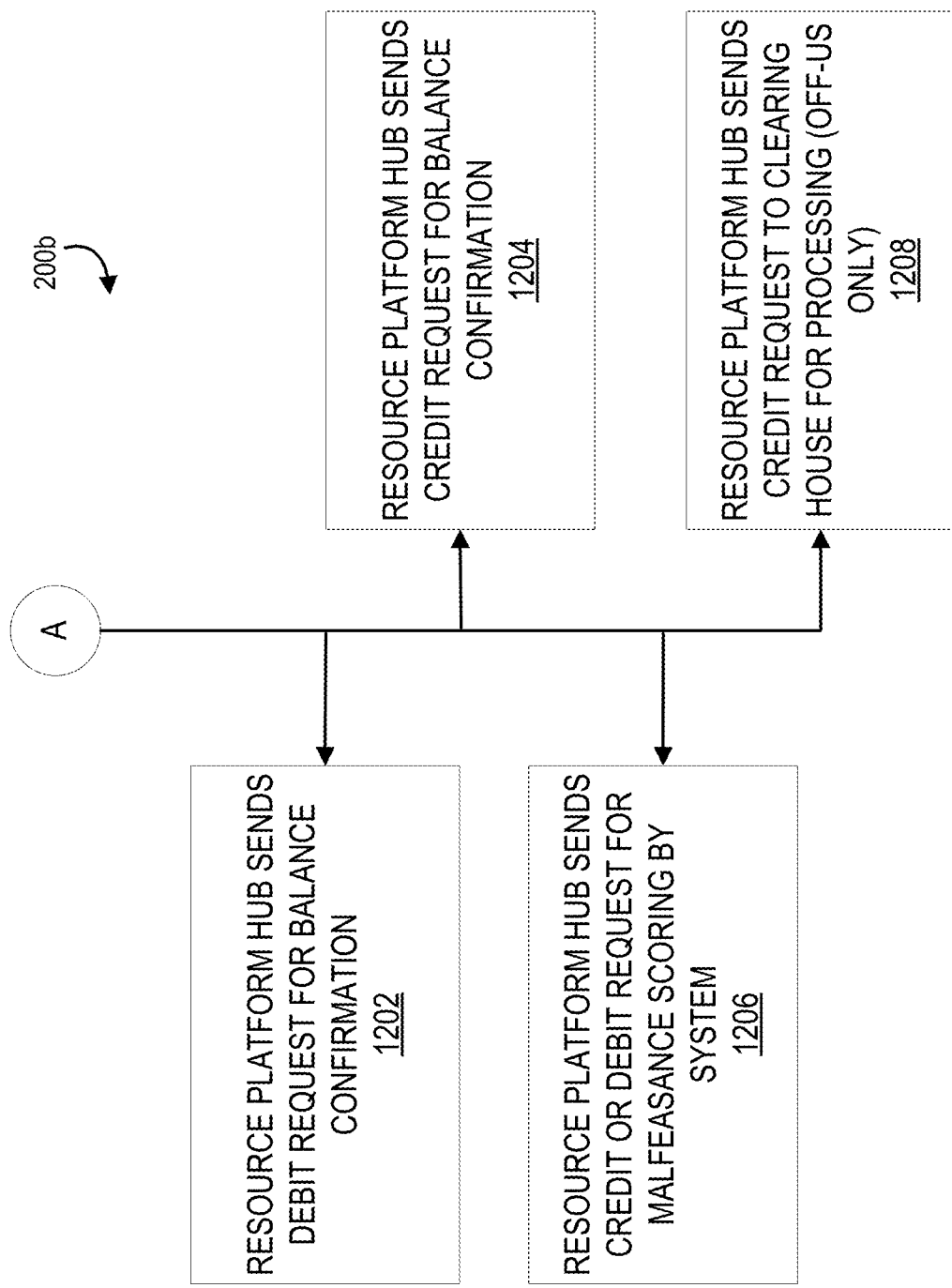
Figure 3:
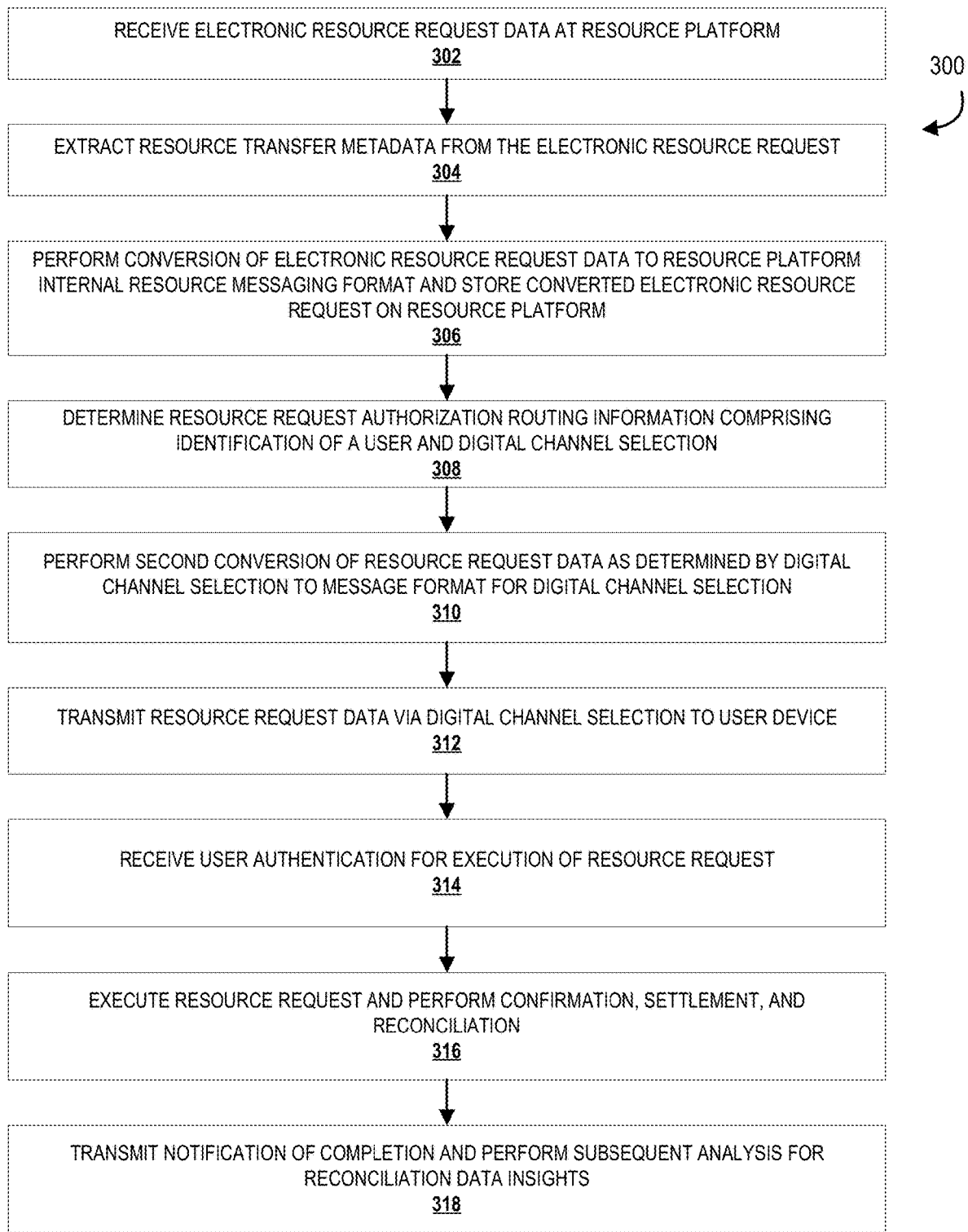

Having thus described embodiments of the invention in general terms, reference will now be made to the accompanying drawings, wherein:

FIG. 1 provides a resource platform system environment 100, in accordance with one embodiment of the present invention;

FIG. 2a provides a high level process flow diagram 200a of automated resource request processing, in accordance with one embodiment of the present invention;

FIG. 2b provides a process flow diagram 200b for execution of resource transfer, in accordance with embodiments of the present invention; and FIG. 3 provides a high level process flow diagram 300 for generation and analysis of real-time resource requests, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. The user may interact with the entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, "resource platform" refers to the primary platform of the invention that is responsible for the device, processes, and methods of supporting and providing generation and analysis of real-time resource requests from one or more user accounts to other accounts, such as from entity accounts to merchant accounts, user accounts, vendor accounts, and the like. In some embodiments, the resource platform may be managed by the same entity that manages one or more user resource accounts, or may be managed by a separate entity in other embodiments. The resource platform is designed to operatively communicate with one or more entities, users, and systems over a network via one or more user devices or third party devices.

As used herein, an "third party system" may be a system managed by an entity other than the entity that manages the resource allocation platform. In other embodiments, the third party system may be a user device belonging to a user who is not associated with the resource allocation platform or vendor service systems, but has been granted access to a web portal, application, or other resource provide data or interface with the resource allocation platform or vender service systems. In some embodiments, an authorized third party device may refer to a device that has been previously identified as used by an authorized user for accessing the resource allocation platform resources.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

As used herein, the term "resource" may refer to physical currency, electronic data, or an exchangeable currency having a value (e.g., funds) or the like. A computing resource may refer to elements of one or more computing devices (e.g., processor, memory, communication device, and the like) networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). As used herein, a "resource vehicle" may refer to any medium for resource conveyance from one resource location to another. As used herein, a "resource transfer" may refer to a transfer of resources between accounts, such as the movement of funds or currency from one account to another via a crediting or debiting process. A "request" or "request for resource distribution" or "request for resource transfer" may refer to an invoice or request for payment of resources for goods, services, and the like. A "resource rail" may refer to a payment rail such as an automated clearinghouse (ACH) rail, real-time payment rail, a virtual or digital payment rail, a peer to peer payment rail, and the like.

As used herein, an "interaction" or "connection" may refer to any communication between one or more users or systems within the system environment described herein. For example, an interaction may refer to a transfer or exchange of user information (e.g., data, information, passwords, PIN codes, and the like) between systems, devices, and/or application; an accessing of stored data by one or more devices; a transmission of a requested task; a sharing or leveraging of resources (e.g., computing resources) between device; or the like. An interaction may include user interactions with a user interface (e.g., clicking, swiping, text or data entry, and the like), authentication actions (e.g., signing-in, username and password entry, PIN code, and the like), account actions (e.g., account access, and the like) and the like. In a specific embodiment, an "interaction" may refer to a resource transfer executed between one or more users and/or entities (e.g., a transaction).

As used herein, the term "entity" may be used to include any business or vendor system that the platform may interact with to complete a real-time resource request or resource distribution activity. The terms "financial institution" and "financial entity" may be used to include any organization that processes financial transactions including, but not limited to, banks, credit unions, savings and loan associations, investment companies, stock brokerages, insurance companies, and the like. In other embodiments, an entity may be a business, organization, a government organization or the like that is not a financial institution. In a specific embodiment, an entity is a resource providing entity such as a financial institution that provides a resource vehicle and/or service (e.g., finance associated account) to a user. The resource vehicle and/or location may include supplementary resources.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account or particular user device) and determine that the user has authority to access a resource account, service, or system. In some embodiments, the system may be owned or operated by an entity. In such embodiments, the entity may employ additional computer systems, such as authentication servers, to validate and certify resources inputted by the plurality of users within the system.

As used herein, "web portal" may refer to a secure web site or web-accessible interface provided by the resource allocation platform to users, authorized third parties, and vendor service systems. In some embodiments, the web portal may be accessed via a provided user application on the user device or may be a secure web page accessible via a browser on a user device. In some embodiments, the web portal may used to display information from the application of the resource allocation platform, such as PIN codes, user resource account authorization information (e.g., username, password, account number, security questions, and the like). In specific embodiments, the web portal may be accessible only to users which have been granted access by the resource allocation platform or the vender service system, provided account information to the resource allocation platform, or set up an account with the resource allocation platform during an on-boarding process, and these specific users may be referred to as "on-boarded users." In some embodiments, accessing the web portal or user application may require further authentication steps such as three-step authentication (e.g., via use of an authentication application, responding to an email link, and the like) biometric authentication (e.g., leveraging capability of the user device itself via biometric readers and processing), and the like FIG. 1 provides a resource platform system environment 100, in accordance with one embodiment of the present invention. FIG. 1 provides the system environment 100 for which the distributive network system with specialized data feeds associated with an interconnected resource distribution and retention network. FIG. 1 provides a unique system that includes specialized servers and system communicably linked across a distributive network of nodes required to perform the functions described herein.

As illustrated in FIG. 1, the resource platform 206 is operatively coupled, via a network 201 to the user device 204, entity systems 207, and to third party system 208. In this way, the resource platform 206 can send information to and receive information from the user device 204, entity systems 207, and to third party system 208. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), public switched telephone network (PSTN), or any other type of network or combination of networks. The network 201 may provide for wireline, wireless, or a combination wireline and wireless communication between devices on the network 201.

In some embodiments, the user 202 is an individual or entity that has one or more user devices 204. The user 202 may be an employee of an entity. The user 202 may wish to complete a resource transaction with the third party system 208, or submit a resource request to the resource platform 206, which in some embodiments may be submitted via the entity systems 207. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the resource platform 206, the third party system 208, and the entity systems 207. As such, the communication device 212 generally comprises a modem, server, or other device for communicating with other devices on the network 201. The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the resource platform 206. In some embodiments, the user application is a banking application, peer-to-peer payment application, or account management application that provides functionality for the initiation of requests for payment, initiation of distribution of resources between resource accounts, or may provide details regarding a pending resource request.

As further illustrated in FIG. 1, the resource platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the third party system 208, the entity systems 207, and the user device 204. As such, the communication device 246 generally comprises a modem, server, or other device for communicating with other devices on the network 201.

As further illustrated in FIG. 1, the resource platform 206 comprises computer-readable instructions 254 stored in the memory device 250, which in one embodiment includes the computer-readable instructions 254 of an application 258. In some embodiments, the memory device 250 includes data storage 252 for storing data related to the system environment 100, but not limited to data created and/or used by the application 258. In some embodiments, the data storage 252 of the resource platform 206 may be used to store information related to resource requests, resource transfers, user configuration data, and settlement, confirmation, and reconciliation data related to resource requests and transfers. Data storage 252 of the resource platform may be integral in providing a capability for later accessing resource request information for regulatory or audit purposes, allowing users 202 to access and trace the history of resource requests and transfers if authorized to do so. Data stored regarding resource requests and transfers on data storage 252 may be stored in one or more industry standard formats, originally received format (e.g., a resource request may be received from an entity system or third party system in a file format that is later converted to an industry standard format used by resource platform 206). In some embodiments, metadata associated with resource request data and resource activity or transfer data may be used to locate and compile data that is relevant to a particular report. For instance a user 202 may request history data for a single resource request, a single user, a particular time frame, and the like.

In one embodiment of the resource allocation platform 206 the memory device 250 stores an application 258. In one embodiment of the invention, the application 258 may associate with applications having computer-executable program code. Furthermore, the resource allocation platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more third party system 208, entity systems 207, and/or user device 204.

As illustrated in FIG. 1, the entity systems 207 is connected to the third party system 208, user device 204, and resource allocation platform 206. The entity systems 207 has the same or similar components as described above with respect to the user device 204 and the resource allocation platform 206. While only one entity systems 207 is illustrated in FIG. 1, it is understood that multiple entity systems 207 may make up the system environment 100. The entity systems 207 may be associated with one or more financial institutions, entities, or the like and function as an administrator for the user to interact with in order to complete resource request processing and distribution with a merchant. In some embodiments, the entity systems 207 is or includes an interactive computer terminal that is configured to initiate, perform, complete, and/or facilitate one or more resource transfers.

As illustrated in FIG. 1, the third party system 208 is connected to the entity systems 207, user device 204, and resource platform 206. In some embodiments, the third party system 208 may be associated with the entity systems 207.

The third party system 208 has the same or similar components as described above with respect to the user device 204. While only one third party system 208 is illustrated in FIG. 1, it is understood that multiple third party system 208 may make up the system environment 100. In some embodiments, the third party system 208 may interact with the resource system 206 to retrieve data and initiate resource request processing via an application programming interface (API) protocol that is managed by the entity system 207 or resource platform 206. In this way, third party system 208 may securely access data and generate resource request processes via the resource platform 206 without accessing the system itself via an automated API protocol that authorizes certain third party systems 208 to access certain data and perform specific functions. In some embodiments, the API protocol may be tailored to allow different data access or functionality based on the needs or access level granted to each of one or more unique third party systems 208.

It is understood that the servers, systems, and devices described herein illustrate one embodiment of the invention. It is further understood that one or more of the servers, systems, and devices can be combined in other embodiments and still function in the same or similar way as the embodiments described herein. The third party system 208 may generally include a processing device communicably coupled to devices as a memory device, output devices, input devices, a network interface, a power source, one or more chips, and the like. The third party system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the third party system 208 described herein.

FIG. 2a provides a high level process flow diagram 200a of automated resource request processing, in accordance with one embodiment of the present invention. As shown in block 102, the process begins wherein a resource request is received by the system. A resource request may be received internally from a user or employee of the entity system 207, while in other embodiments the resource request may be received from a third party system 208. In either case the resource request is then reviewed at the resource platform 207, as shown in block 104. In some embodiments, this review may include a screening process at the resource system 207 accounts payable division to concur resource request receipts, invoices, amounts, approved categories of resource spend types, and the like. In some embodiments, this stage may include filtering entity-approved resource requests on a per-user basis, wherein one or more users may have broader authorization in terms of categories, amounts, and the like that they may submit with regard to resource requests as compares to one or more other users (e.g., depending on an employee's status within the entity, the employee may have more or less leeway in spending company resources, and thus submitting resource requests for reimbursement as compared to other employees).

Next, as shown in block 106, the system may submit the resource request information using an internal system message format, which in some embodiments may be an international organization for standardization (ISO) 20022 format. For instance, ISO 20022 is an ISO standard for electronic data interchange between financial institutions. It describes a metadata repository containing descriptions of messages and business processes, and a maintenance process for the repository content. Conversion of the resource request data and metadata to ISO 20022 or a similar industry standard internal format at this stage allows the information of the resource request to be quickly processed throughout the resource platform 207, and retains data and metadata in a manner that allows for cross compatibility and ease of integration of the resource platform with third party system 208. In some embodiments, the original resource request submission may contain data such as transaction identifiers, invoice numbers, uniform resource locator (URL) data, and the like which is converted to the internal standardized format of data and metadata for increased compatibility and ease of processing.

Next, at block 108, the system may make a determination of resource routing based on the resource request information, such as through an enterprise payments hub, or a resource payment orchestration system of the entity or resource platform. In doing so, the system may identify "on-us" recipients or senders of the resource request, or in other words, resource accounts associated with the resource request that may be located at or managed by the same entity that manages the resource platform. In other embodiments, the system may determine that the resource recipient of the resource request is "off-us," or is not an account located at or managed by the entity that manages the resource platform. At this stage, the system may also determine a user for which the resource platform will route a detailed display of resource request information, as shown in block 110. The resource request information is then routed via a digital channel, as shown in block 112. The digital channel used in block 112 may differ based on user set preferences, entity preferences, or third party system preferences, and may include electronic notifications of many types, including, but not limited to, user resource management mobile applications, email messaging, SMS messaging, multimedia messaging, and the like. In some embodiments, block 112 may also involve an additional message conversion component, as the digital channel may likely have a different message format than the industry standard format used internally by the resource platform.

As shown in block 114, the digital channel may then display the resource request details. In some embodiments, the resource platform 206 may route resource request information on a periodic basis in batch format, wherein information for multiple resource requests may be forwarded via the digital channel. For instance, the system may route resource request information on a daily basis at a certain time of day, as determined by the resource platform or user preferences. In this embodiment, the digital channel may transmit and display information for multiple resource requests at one time, which the user may decide to complete, as shown in block 116. In some instances, the decision to complete resource requests may be a bifurcated process, wherein the user appoints or pre-authorizes another user for proxy review or approval of resource requests of an assistant or one or more other users pursuant to some simple indication from the user that one or more of the resource requests should be further reviewed and approved if possible. In some embodiments, the user may review and fully authorize the resource requests themselves. In other embodiments, some resource requests in a batch may be authorized, while others are not.

The process of authorizing resource requests may also include security measures implemented by the resource platform as well, such as the entering of a user password, a three way authentication mechanism (e.g., pre-shared key, transmission of authentication code to previously authenticated device associated with the user, transmission of a secure code to a secure digital address of the user such as an entity email address, and the like), biometric authentication, and the like. In embodiments where the user authorizes resource requests to be authenticated via proxy, the user may pre-authorize someone on the user's behalf to fully review and authorize distribution of resources for resource requests. For instance, a particular user may be enabled to reply to the resource platform with a simple "yes, authorize all," or select, via the user interface of a user device, specific resource requests that the user would like to proceed with authorizing, which would then route the selected resource request details to the particular user's appointed or assigned proxy approval assistant for full review and authorization.

Next, as shown in block 118, the system routes the authorized resource request for execution, or the process of crediting or debiting the resource amount of the resource request to or from the designated accounts. In some embodiments, this step may again include conversion to an internal message language based on industry standard for such purposes, such as, but not limited to, PACS.008 extensible markup language (XML) routing format. In some embodiments, this may be done based on the digital channel formatted resource request information, or the system may refer back to the previous internal format ISO standard for easier and more detailed conversion (e.g., ISO internal standard format may contain additional metadata not transmitted in the digital channel message).

Next, as shown in block 120, the system performs the execution of the resource transfer based on the authorized resource request details, which is discussed further in regard to FIG. 2b. After the resource transfer has been executed, the system conducts confirmation, settlement, and reconciliation processes, as shown in block 122, before finally transmitting a notification of completion as shown in block 124. Confirmation may include confirming that resources have been transferred and accounted for in a destination resource account, or that required resource amounts exist in the source resource account and are available to be moved in order to meet the amount of the resource request. Settlement may include confirming that the amount of resources transferred pursuant to execution of the resource request balance between the originating and destination accounts (e.g., sent and received resources are the same amount).

Reconciliation may include an additional confirmation of data regarding one or more resource transfers, and may involve more detailed metadata that offers valuable insight to entities or third parties utilizing the resource platform. For instance, the system may conduct data analytics during the reconciliation process to determine a number of resource transfers in a given category, for a given purpose, for a specific user or group of users, for a specific geographical area, and the like. In some embodiments, this reconciliation process may offer valuable insight for which entity or third party system procedures may respond or adapt to. For instance, in some cases the reconciliation data may indicate that resources were heavily utilized by users located in one geographical area to frequently travel to a second geographical area. This data may indicate to the entity or resource platform that resource expenditure may be reduced by relocating such users to an office in the second geographical area. In another embodiment, the data may indicate that a certain group of users appears to prefer one method of travel to another, and the system may compare user data for the certain group of users to ascertain other common data points that may indicate an insightful trend. For instance, the certain group of users may all reside in a particular geographic area, and the entity may use this data to predict that users from that geographic area may tend to prefer a specific means of travel, and may adapt to be more proactively accommodating to perceived regional preference.

FIG. 2b provides a process flow diagram 200b for execution of resource transfer, in accordance with embodiments of the present invention. As shown, the process 200b may include either a credit or a debit request, and includes sending of either of these resource transfers for balance confirmation (e.g., to check that available resources are present in the source resource account, or to check that the destination resource account may receive resources or has received credited resources), as shown in blocks 1202 and 1204, respectively. In either the case of a credit or a debit request for resources is transmitted, the resource platform may enact a policy to always submit the request to a resource platform malfeasance scoring system, as shown in block 1206. In some embodiments, the malfeasance scoring system may use machine learning algorithms, multi-channel data, or stored data in order to identify potentially problematic resource accounts, transfers, and the like that may be known or suspected of malfeasant activity. As shown in block 1208, if the resource request involves an off-entity resource account, the resource platform may send the request for credit or debit of resource to a clearing house for processing once the previously described steps have been completed.

FIG. 3 provides a high level process flow diagram 300 for generation and analysis of real-time resource requests, in accordance with embodiments of the present invention. As shown at block 402, the process begins whereby resource request data is received at the resource platform. The resource may be submitted to the resource platform by any number of users or entities depending on the embodiment of the invention, including by entity employees, merchants, third party entities, and the like. The resource platform then extracts resource transfer metadata from the resource request, as shown in block 404. Metadata extracted from the resource request may include, but is not limited to, resource type or currency type, request purpose, merchant identification information, itemized product or service resource expenditure information, date, time, geolocation data, resource amounts, user identification information, resource account information (e.g., source or destination account information), routing information, preferred resource transfer rail information, and the like.

Next, as shown in block 306, the resource platform may perform conversion of the resource request data to an industry standard resource messaging format used by the resource platform. As discussed, in some embodiments, this may include ISO 20022 standard formatting, but it is understood that the standard formatting could be adapted based on advances in technology or industry standard, widespread adoption of a different standard, a need for a different standard by a third party entity that utilizes the resource platform, and the like. It is understood that the conversion would ideally be completed in such a manner as to retain all metadata transaction details for the resource request, and may provide greater functionality for additional metadata to be appended. For instance, in some embodiments, the originally received data may include only a resource request invoice, while the converted formatting may append a date, time, merchant code, category, user comments, and the like. Once the resource request data has been converted, the system determines resource request authorization routing information, as shown in block 308, based on resource platform instructions. The authorization routing information may comprise identification of one or more users and a selection of a digital channel for transmitting the resource request information.

Next, the resource platform may perform a second conversion of resource request data as determined by the selected digital channel on which the data is to be transmitted. For instance, if the resource data is to be transmitted to a user device via SMS text, email message, and the like, the resource platform may convert the data into plaintext, HTML, XML, and the like in order to comply with the selected digital channel formatting requirements. It is understood that these are limited embodiments and that any number of digital channels may be used depending on the destination device type and user or entity preferences. In some embodiments, the resource platform may store user configurations for each user containing user authorization preferences, user access restrictions and allowances, and other user information such as device information registered to the user, usernames, passwords, and the like. Next, the resource platform transmits the converted resource request data via the selected digital channel to the user device for authorization, as shown in block 312. In some embodiments, the resource platform may transmit more than one resource request for authorization at one time in a batch format, and may automatically perform the combination of the multiple resource requests in the bath during the digital channel conversion process.

The resource platform receives user authorization for the execution of one or more resource requests, as shown in block 314. As previously discussed in regard to FIG. 2a, this may include authorization by proxy depending on the user's preferences, capabilities, and allotted support capacity (e.g., whether or not the user has a supporting staff or assistant assigned to them with pre-authorized clearance to authorize resource requests on the user's behalf). The resource platform then executes the authorized resource requests, and performs confirmation, settlement, and reconciliation, as shown in block 316. Finally, as shown in block 318, the process concludes wherein the resource platform transmits a notification of completion of the authorized resource request, and may perform subsequent analysis for reconciliation data insights. As previously discussed, reconciliation may include an additional confirmation of data regarding one or more resource transfers, and may involve more detailed metadata that offers valuable insight to entities or third parties utilizing the resource platform. For instance, the system may conduct data analytics during the reconciliation process to determine a number of resource transfers in a given category, for a given purpose, for a specific user or group of users, for a specific geographical area, and the like. In some embodiments, this reconciliation process may offer valuable insight for which entity or third party system procedures may respond or adapt to. For instance, in some cases the reconciliation data may indicate that resources were heavily utilized by users located in one geographical area to frequently travel to a second geographical area. This data may indicate to the entity or resource platform that resource expenditure may be reduced by relocating such users to an office in the second geographical area. In another embodiment, the data may indicate that a certain group of users appears to prefer one method of travel to another, and the system may compare user data for the certain group of users to ascertain other common data points that may indicate an insightful trend. For instance, the certain group of users may all reside in a particular geographic area, and the entity may use this data to predict that users from that geographic area may tend to prefer a specific means of travel, and may adapt to be more proactively accommodating to perceived regional preference.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application:

| U.S. Patent Application Ser. No. | Title | Filed On |
|---|---|---|
| 16/837,868 | SYSTEM AND METHODS FOR PROCESSING AND AUTHORIZATION OF REAL-TIME RESOURCE REQUESTS | Apr. 1, 2020 |

The invention claimed is:

1. A system for generation and analysis of real-time resource requests via a resource platform, the system comprising:
  at least one memory device with computer-readable program code stored thereon;
  at least one communication device;
  at least one processing device operatively coupled to the at least one memory device and the at least one communication device, wherein executing the computer-readable program code is configured to cause the at least one processing device to:
  receive resource request data associated with a resource request at the resource platform;
  extract resource transfer metadata from the resource request data, wherein resource transfer metadata comprises a resource transfer type, a resource transfer purpose, an entity identification, itemized product or service cost information, a date, a time, geolocation data, a total resource amount, a resource type, user identification information, and resource account information;
  convert the resource request data and resource transfer metadata to an internal resource message format and store converted data on the resource platform;
  determine that a resource recipient of the resource request is not an account located at or managed by the entity that manages the resource platform;
  in response to determining that a resource recipient of the resource request is not an account located at or managed by the entity that manages the resource platform, determine a user for which the resource platform will route a detailed display of resource request information, wherein the user is responsible for authentication of the resource request data;
  access a user configuration for the user to determine authorization routing information comprising a digital channel;
  perform a second conversion of resource request data to a format for transmission over the digital channel;
  transmit the resource request data to a user device of the user via the digital channel;
  receive user authentication for execution of the resource request;
  execute a resource transfer in response to receiving user authentication for execution of the resource request;
  perform confirmation, settlement, and reconciliation of the executed resource transfer; and
  transmit notification of completion of the execution of the resource transfer to the user or one or more entities.

2. The system of claim 1, wherein the internal resource message format is an industry standard ISO 20022 format.

3. The system of claim 1, wherein the digital channel further comprises a communication channel such as a web portal, mobile application, email message, or a text message.

4. The system of claim 1, wherein reconciliation further comprises analyzing multiple executed resource transfers to identify trends in resource transfer metadata such as geolocation, or category of services and goods.

5. The system of claim 1, wherein performing settlement further comprises confirming that an amount of resources transferred balance between an originating and a destination account.

6. The system of claim 1, wherein confirmation further comprises verifying that a specific amount of resources have been transferred to a destination resource account, or that the specific resource amount exists in a source resource account.

7. A computer program product generation and analysis of real-time resource requests via a resource platform, the computer program product comprising a non-transitory computer-readable storage medium having computer-executable instructions to: receive resource request data associated with a resource request at the resource platform;
  extract resource transfer metadata from the resource request data, wherein resource transfer metadata comprises a resource transfer type, a resource transfer purpose, an entity identification, itemized product or service cost information, a date, a time, geolocation data, a total resource amount, a resource type, user identification information, and resource account information;
  convert the resource request data and resource transfer metadata to an internal resource message format and store converted data on the resource platform;
  determine that a resource recipient of the resource request is not an account located at or managed by the entity that manages the resource platform;
  in response to determining that a resource recipient of the resource request is not an account located at or managed by the entity that manages the resource platform, determine a user for which the resource platform will route a detailed display of resource request information, wherein the user is responsible for authentication of the resource request data;
  access a user configuration for the user to determine authorization routing information comprising a digital channel;
  perform a second conversion of resource request data to a format for transmission over the digital channel;
  transmit the resource request data to a user device of the user via the digital channel;
  receive user authentication for execution of the resource request;
  execute a resource transfer in response to receiving user authentication for execution of the resource request;
  perform confirmation, settlement, and reconciliation of the executed resource transfer; and
  transmit notification of completion of the execution of the resource transfer to the user or one or more entities.

8. The computer program product of claim 7, wherein the internal resource message format is an industry standard ISO 20022 format.

9. The computer program product of claim 7, wherein the digital channel further comprises a communication channel such as a web portal, mobile application, email message, or a text message.

10. The computer program product of claim 7, wherein reconciliation further comprises analyzing multiple executed resource transfers to identify trends in resource transfer metadata such as geolocation, or category of services and goods.

11. The computer program product of claim 7, wherein performing settlement further comprises confirming that an amount of resources transferred balance between an originating and a destination account.

12. The computer program product of claim 7, wherein confirmation further comprises verifying that a specific amount of resources have been transferred to a destination resource account, or that the specific resource amount exists in a source resource account.

13. A computer implemented method f generation and analysis of real-time resource requests via a resource platform, the computer implemented method comprising:

receiving resource request data associated with a resource request at the resource platform;

extracting resource transfer metadata from the resource request data, wherein resource transfer metadata comprises a resource transfer type, a resource transfer purpose, an entity identification, itemized product or service cost information, a date, a time, geolocation data, a total resource amount, a resource type, user identification information, and resource account information;

converting the resource request data and resource transfer metadata to an internal resource message format and store converted data on the resource platform;

determining that a resource recipient of the resource request is not an account located at or managed by the entity that manages the resource platform;

in response to determining that a resource recipient of the resource request is not an account located at or managed by the entity that manages the resource platform, determining a user for which the resource platform will route a detailed display of resource request information, wherein the user is responsible for authentication of the resource request data;

accessing a user configuration for the user to determine authorization routing information comprising a digital channel;

performing a second conversion of resource request data to a format for transmission over the digital channel;

transmitting the resource request data to a user device of the user via the digital channel;

receiving user authentication for execution of the resource request;

executing a resource transfer in response to receiving user authentication for execution of the resource request;

performing confirmation, settlement, and reconciliation of the executed resource transfer; and transmitting notification of completion of the execution of the resource transfer to the user or one or more entities.

14. The computer implemented method of claim 13, wherein the digital channel further comprises a communication channel such as a web portal, mobile application, email message, or a text message.

15. The computer implemented method of claim 13, wherein reconciliation further comprises analyzing multiple executed resource transfers to identify trends in resource transfer metadata such as geolocation, or category of services and goods.

16. The computer implemented method of claim 13, wherein performing settlement further comprises confirming that an amount of resources transferred balance between an originating and a destination account.

17. The computer implemented method of claim 13, wherein confirmation further comprises verifying that a specific amount of resources have been transferred to a destination resource account, or that the specific resource amount exists in a source resource account.

* * * * *